INVENTOR
JOHN SELZER
BY Paul O. Pippel
ATTORNEY

Oct. 14, 1958　　　　J. SELZER　　　2,856,225
CONVERTIBLE MOTOR VEHICLE BODY
Filed Dec. 31, 1954　　　　　　　9 Sheets-Sheet 2
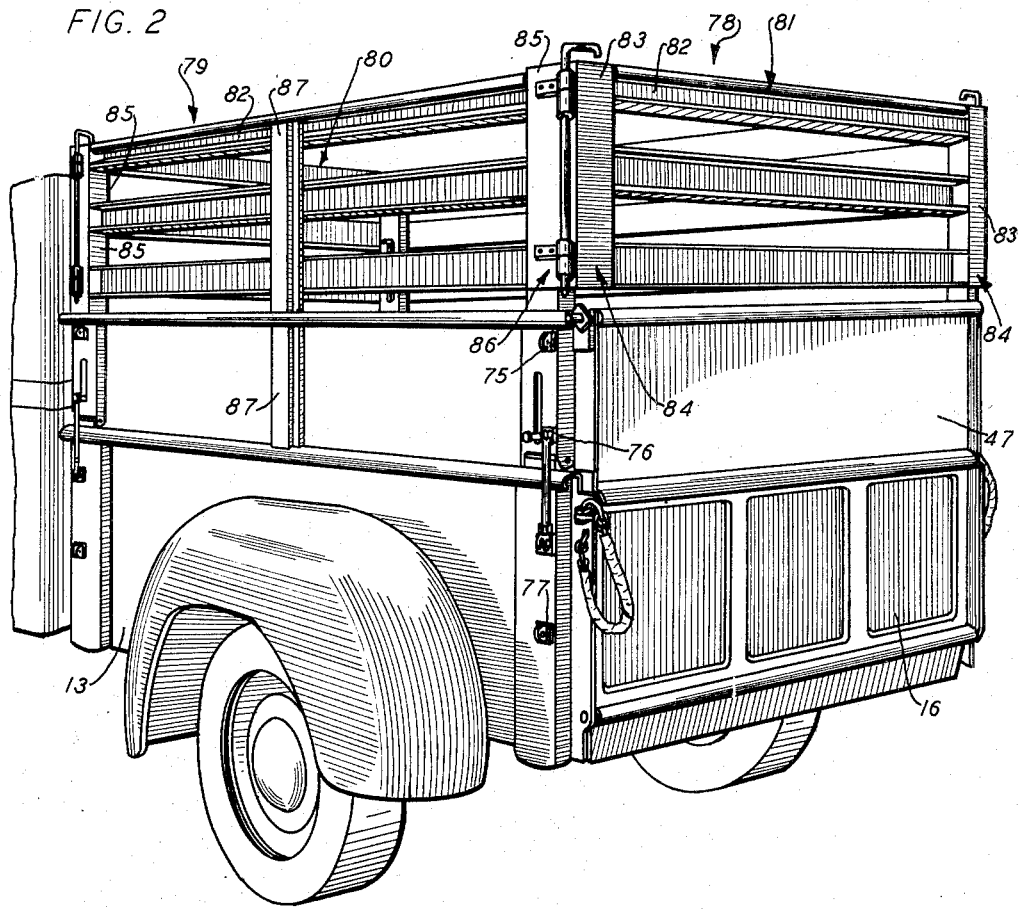
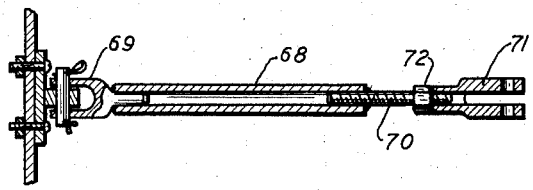
INVENTOR.
JOHN SELZER
ATTORNEY INVENTOR
JOHN SELZER
BY Paul O. Pippel
ATTORNEY Oct. 14, 1958

J. SELZER 2,856,225

CONVERTIBLE MOTOR VEHICLE BODY

Filed Dec. 31, 1954

INVENTOR
JOHN SELZER
BY Paul O. Pippel
ATTORNEY

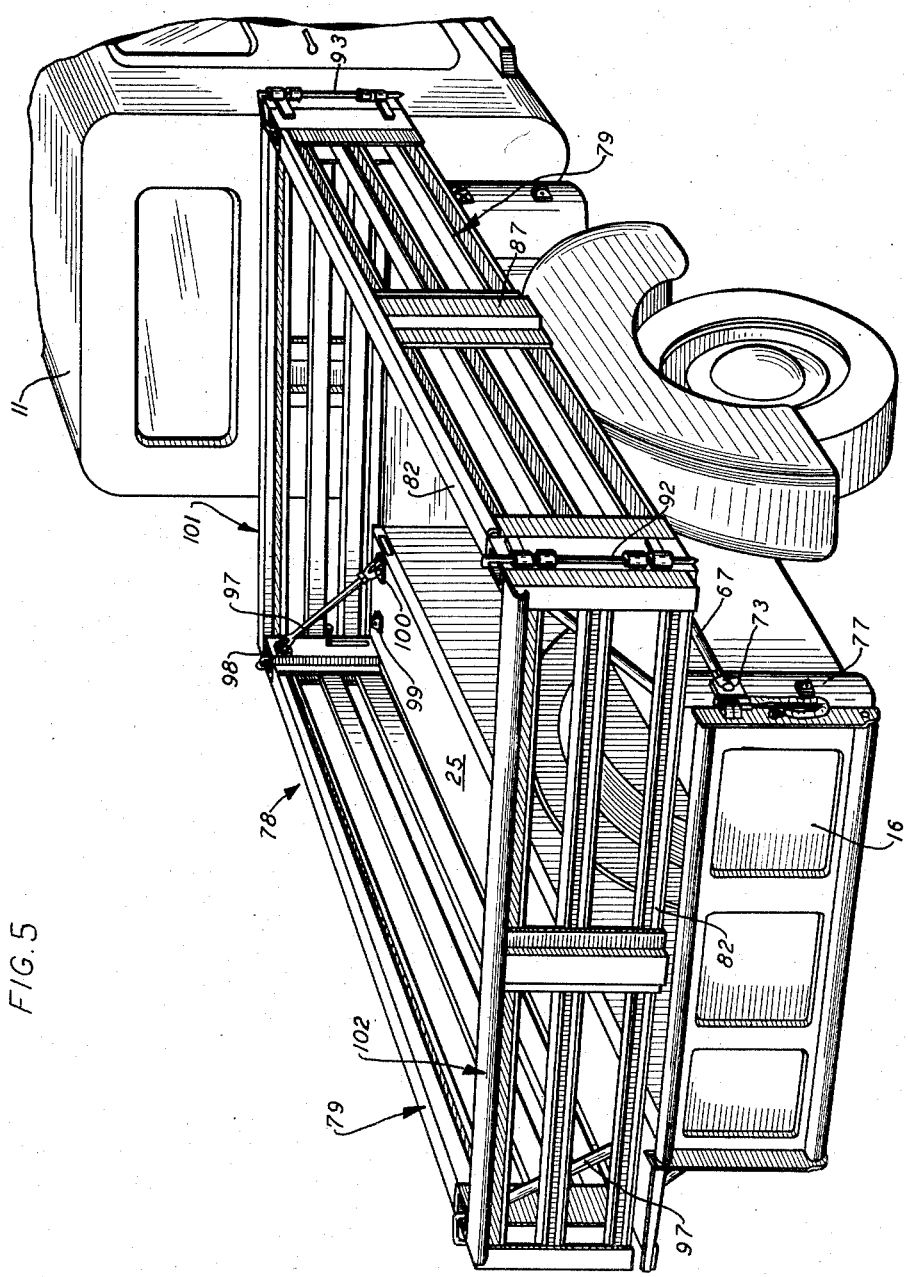

Oct. 14, 1958 J. SELZER 2,856,225
CONVERTIBLE MOTOR VEHICLE BODY
Filed Dec. 31, 1954 9 Sheets-Sheet 6
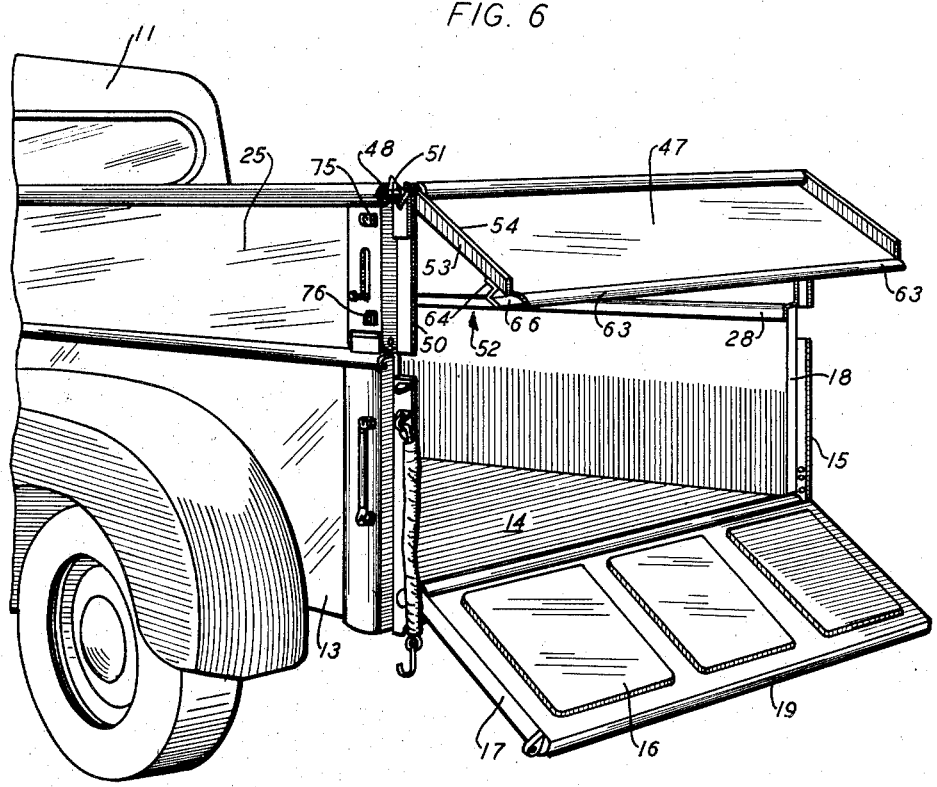
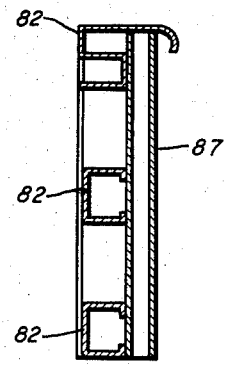
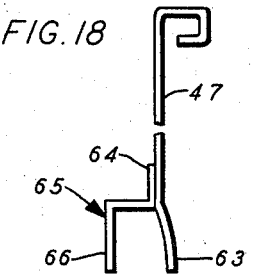
INVENTOR
JOHN SELZER
BY Paul O. Pippel
ATTORNEY

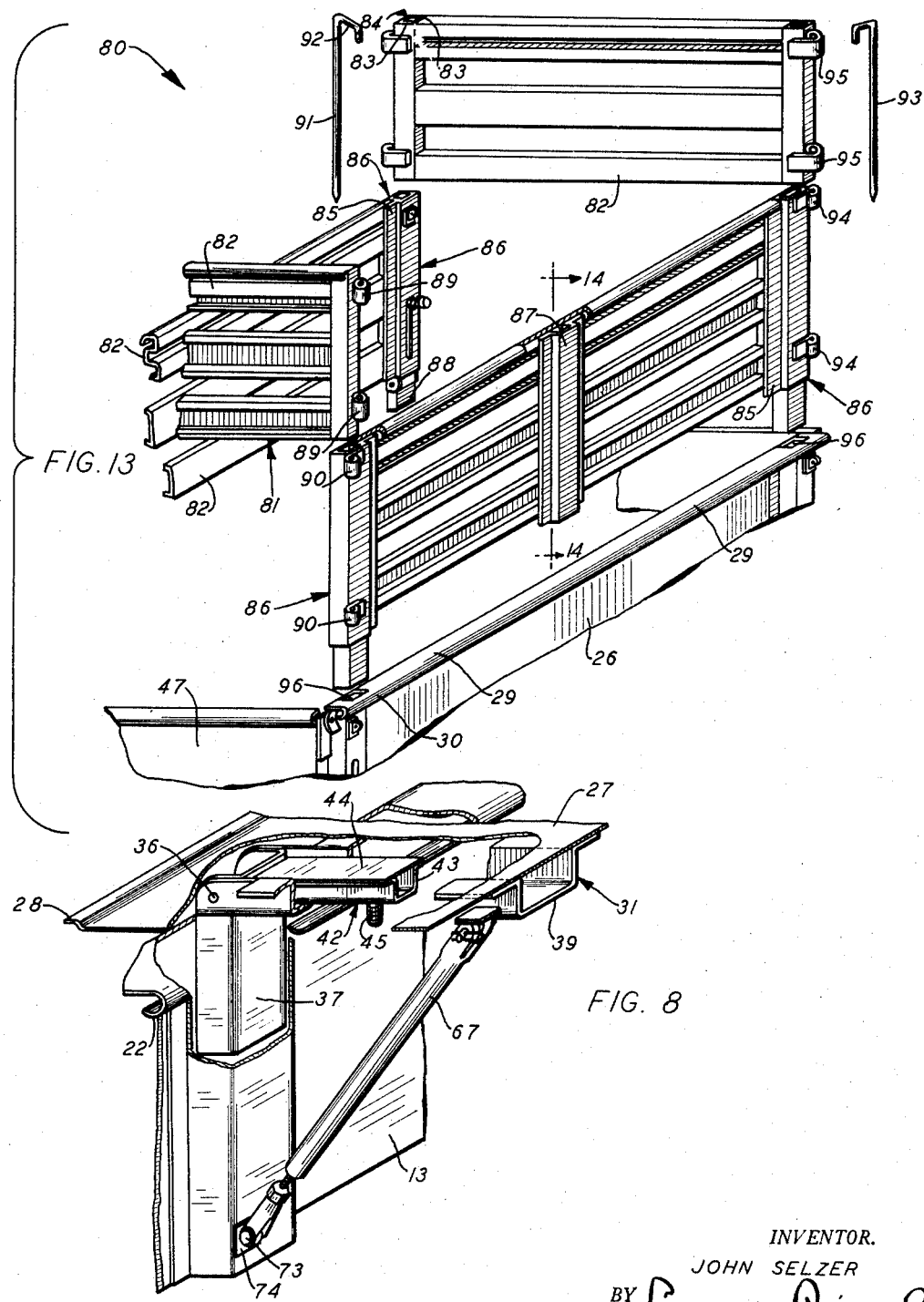

Oct. 14, 1958   J. SELZER   2,856,225
CONVERTIBLE MOTOR VEHICLE BODY
Filed Dec. 31, 1954   9 Sheets-Sheet 8
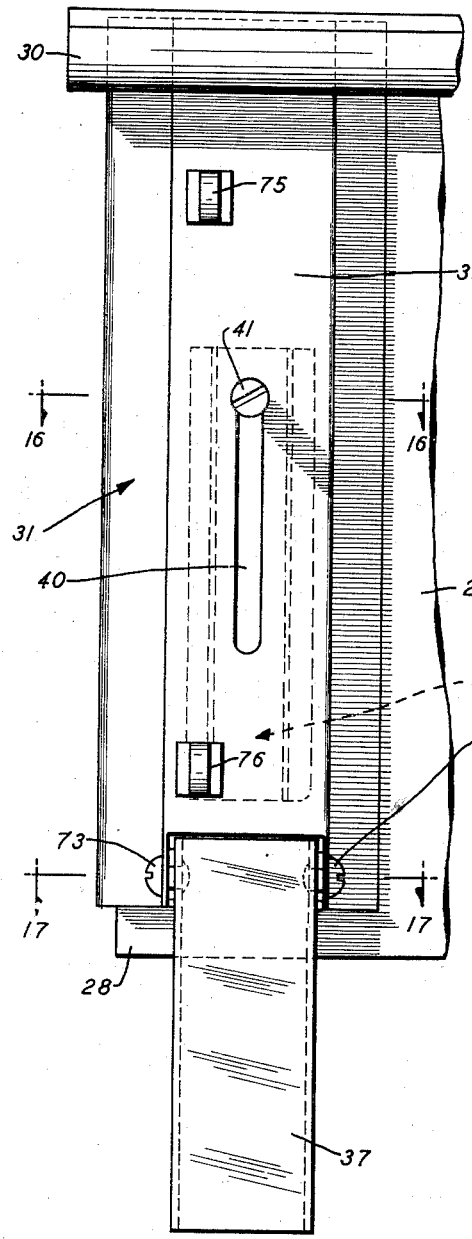
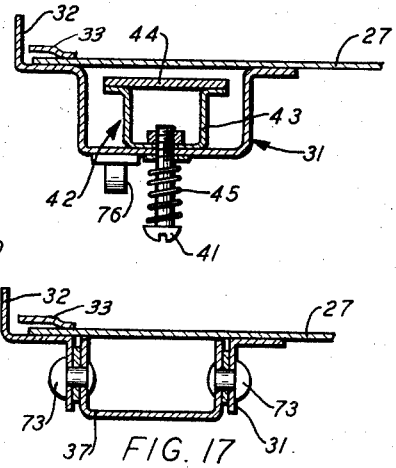
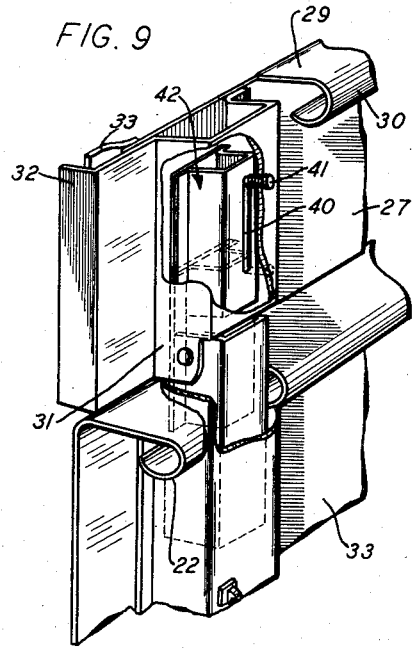
INVENTOR
JOHN SELZER
BY
ATTORNEY Oct. 14, 1958     J. SELZER     2,856,225
CONVERTIBLE MOTOR VEHICLE BODY
Filed Dec. 31, 1954     9 Sheets-Sheet 9
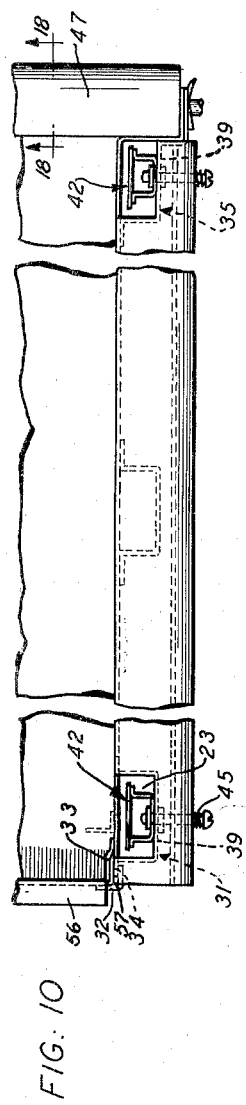
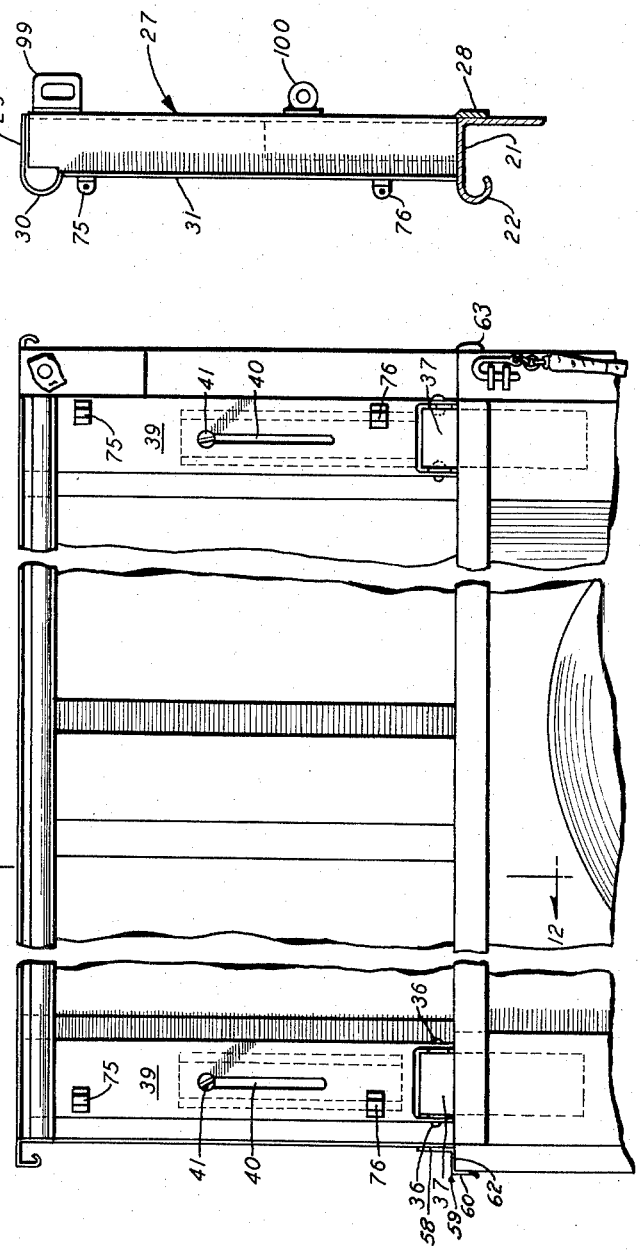
INVENTOR
JOHN SELZER
BY Paul O. Pippel
ATTORNEY United States Patent Office 2,856,225
Patented Oct. 14, 1958

2,856,225

CONVERTIBLE MOTOR VEHICLE BODY

John Selzer, Fort Wayne, Ind., assignor to International Harvester Company, a corporation of New Jersey Application December 31, 1954, Serial No. 479,029

7 Claims. (Cl. 296—13)

This invention relates to motor vehicle bodies, and more particularly to new and improved attachments for conventional pick-up type motor truck bodies designed and constructed so that a conventional pick-up type motor truck body may be easily and simply converted into any one of several body types, each of which is especially adapted for a particular type of duty to thereby increase the utility of conventional pick-up type trucks.

Conventional pick-up type truck bodies usually include a substantially horizontal, longitudinally extending supporting floor which is secured to the vehicle chassis frame. A pair of transversely spaced side panels are rigidly attached to the side marginal edges of the supporting floor and extend vertically a short distance above the level of the supporting floor. A front panel interconnects the forward ends of the side panels adjacent the operator's compartment and an end or tail gate is provided at the rear end of the vehicle. Inasmuch as the front and side panels and the end gate extend vertically from the floor a comparatively short distance and the transverse space in between the side panels is fixed, the kind of cargo and the volume thereof is greatly limited. While the present invention benefits the transportation industry as a whole, it is particularly useful in the agricultural field. In the operation of most modern day farms, it is practically an everyday occurrence to transfer or transport some kind or form of cargo, either on or about the farm, or between the farm and the markets. Thus, because of the variety of cargos transported, such as grain, hay, livestock and machinery, it was imperative that a large number of land vehicles be provided, each of which being particularly suitable to transport a particular cargo. Obviously the initial investment cost and maintenance expenses of a fleet of land vehicles to efficiently solve a farmer's transportation problem is prohibitive except to those farming operations which are relatively extensive and large. When transporting grain or other granular material, the carrying capacity of a conventional pick-up truck body is limited by the vertical height of the side boards or panels, forward end panel and tail gate. By the same token, pick-up truck bodies are not capable of transporting livestock safely because of the relatively low height of the side and end panels and tail gate. Furthermore, the horizontal loading area of a pick-up truck body is limited to the area of the supporting floor, and consequently the capacity of the body to carry articles which are stacked, one upon the other, such as bales of hay or bushel baskets of fruit or vegetables, is limited. The farmer's cargo transportation dilemma is further emphasized when it is realized, that while a great many land vehicles are required to transport various types of cargoes efficiently, certain cargos are only transported periodically and hence any land vehicle designed to transport only a particular cargo is idle frequently. It is, therefore, the primary objective of the present invention to provide inexpensive attachments for pick-up type motor truck bodies whereby the body may be easily and quickly converted to a multitude of different types of bodies particularly suitable to the variety of different duties, without the need or aid of any special tools of any kind.

Another object is to provide a grain tight attachment for a pick-up type truck body, which when applied to the vehicle body, will at least double the grain or other granular material carrying capacity of the body.

A further object is the provision of a stock rack attachment which is readily assembled directly on the body or on an intermediate section, which in turn is attached the body.

Still another object is the provision of a pair of body extensions connected to the side panels or boards of a conventional pick-up truck body, which are adapted to be disposed horizontally and at substantially right angles to the side boards to extend laterally, outwardly therefrom to thereby increase the horizontal loading area of the body or, alternatively, to be disposed vertically and in vertical alignment with the side boards to increase the vertical height of the sides of the truck body.

Still another object is the provision of sturdy, quick detachable means for connecting body extensions to a pick-up type motor truck body in order to adapt the same for many uses.

The foregoing and other important objects and desirable features inherent in and encompassed by the invention, together with many of the purposes and uses thereof, will become readily apparent from a reading of the ensuing description in conjunction with the annexed drawings, in which:

Figure 2 is a view similar to Figure 1 showing a stock rack attachment mounted on a grain-tight box attachment which, in turn, is fastened to the truck body;

Figure 5 is a view similar to Figure 4 with the exception that the forward and rearward ends of the side stock rack panels are interconnected by means of front and rear end members, respectively;

Figure 6 is a perspective view of the extension end closure member swung upwardly from engagement with the vehicle body end gate;

Figure 7 is a detailed enlarged view of a brace rod;

Figure 8 is a detail enlarged view of the connection means employed between the pick-up type truck body and an extension panel in one position of adjustment;

Figure 9 is a view similar to Figure 8 showing the connection means in another position of adjustment;

Figure 10 is a plan view of a portion of the structure illustrated in Figure 1;

Figure 11 is a side elevational view of the structure shown in Figure 10;

Figure 12 is a cross sectional view taken substantially along line 12—12 of Figure 11;

Figure 13 is an exploded view of some of the components of the stock-rack attachment;

Figure 14 is a cross sectional view taken substantially along line 14—14 of Figure 13;

Figure 15 is a side elevational view of one end of an extension panel;

Figure 16 is a sectional view taken substantially along line 16—16 of Figure 15;

Figure 17 is a sectional view taken substantially along line 17—17 of Figure 15; and Figure 18 is a sectional view taken substantially along line 18—18 of Figure 10.

Figure 1:
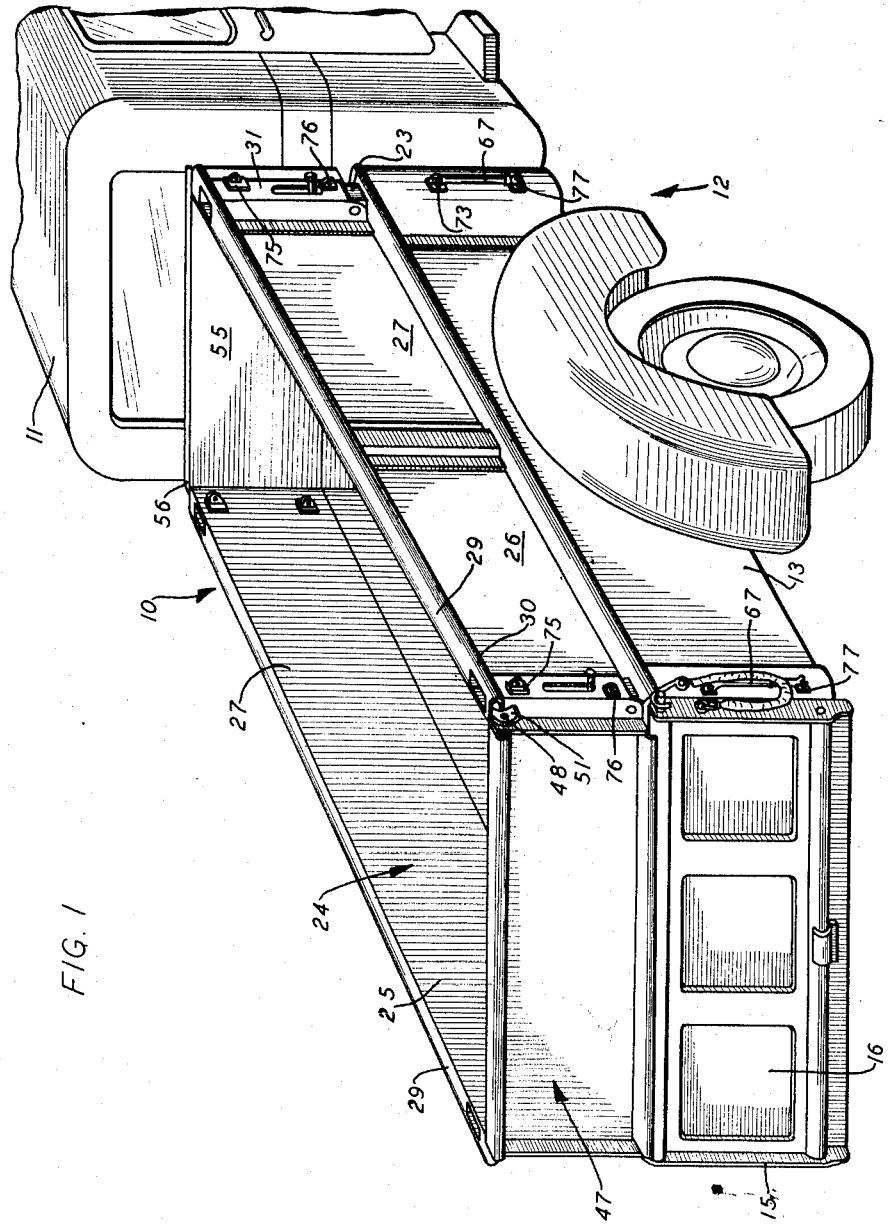
Figure 1 is a perspective view of a pick-up type motor truck taken from a point disposed angularly to the rear of the truck showing a grain tight attachment assembled on the truck body.
Figure 3:
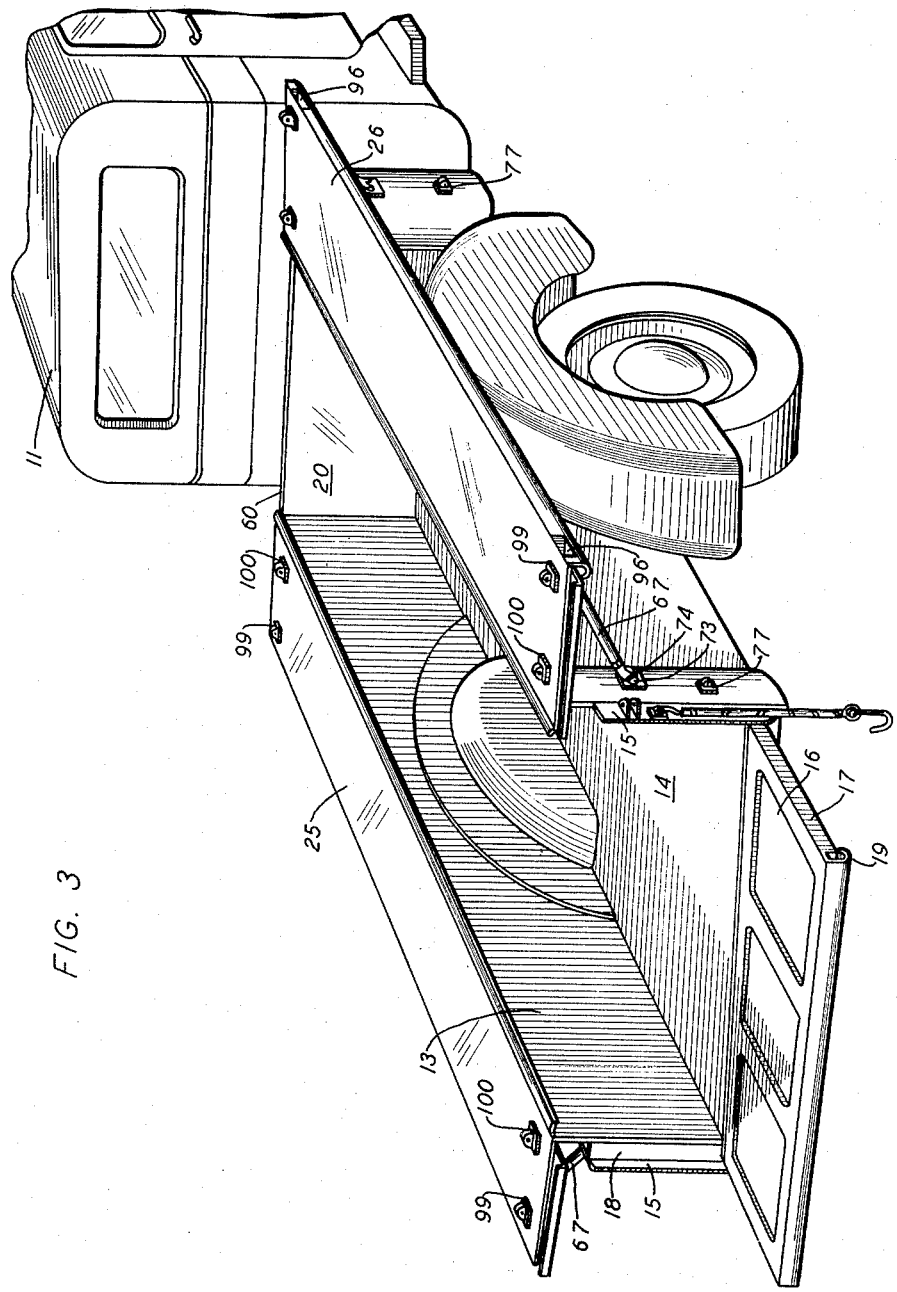
Figure 3 is a perspective view of a pick-up type motor truck body taken from a point disposed angularly to the rear of the motor vehicle showing a pair of attachment panels assembled on the truck and extending transversely outwardly beyond the side panels of the body.

Referring to the drawings in detail, wherein like reference characters designate like elements throughout the various views, there is shown a rear portion of a conventional pick-up type motor truck 10. The motor truck 10 includes a forwardly disposed operator's compartment 11, partially shown, and a pick-up type vehicle body 12. The body 12 is generally illustrated as having a pair of spaced opposite side panels 13 and a floor 14. The rear edge of each side panel 13 is formed with a vertically extending portion 15 formed as an integral part of the panel and providing an offset portion adapted to receive an end gate 16 which is pivoted at its lower end on a transverse horizontal axis to the side panels 13, the axis lying generally in a horizontal plane of the floor 14. Each outwardly facing end 17 of the end gate 16 is adapted to abut a respective portion 15, as shown in Figure 1, when the end gate 16 is in its closed position. Each end surface of the end gate 16 is adapted to overlap the respective laterally extending panel portions 18 when the end gate 16 is in the position shown in Figures 1, 2 and 5 to provide a grain tight seal between the end gate and the side panels 13. The upper end of the end gate 16 is defined by a bead 19, integrally formed thereon, having a circular cross section, as best illustrated in Figure 3.

The forward ends of the side panels 13 are interconnected by means of a front panel 20 having the same vertical dimension as the side panels 13. As best shown in Figures 8, 9 and 12, the top surfaces 21 of the side and front panels 13, 20 are formed by extending the panels horizontally outwardly. A bead 22 having a U-shaped cross section, is integrally formed with the top surface 21 of each side panel 13 and projects outwardly from its respective side panel. The top surface 21 of each of the side panels 13 has a pair of longitudinally spaced upwardly facing openings 23, as shown in Figure 10, formed therein which serves as stake receiving sockets. It will be understood that the openings 23 are disposed at each of the four corners of the body 12.

The above described vehicle structure is considered conventional and forms no part of the present invention. While a conventional pick-up type truck is extremely useful for many hauling operations it has several drawbacks which limit its use in certain operations. It is obvious that the volume of load which a conventional pick-up truck can carry is definitely limited because of the extremely short distance the panels and end gate extend vertically above the floor. As an example, the motor truck may be capable of carrying a load weighing twice as much as it actually does since the volumetric capacity rather than the weight capacity of the truck way be the determining factor in certain hauling operations. This is especially true when the truck is used for hauling granular material such as grain or the like. In order to increase the volumetric capacity of the motor truck body 12, a grain tight attachment, designated generally by numeral 24 and shown in Figures 1 and 2, is fastened to the body. The attachment 24 includes a pair of side sections 25, 26. Each side section 25, 26 includes a single, substantially flat sheet of metal 27. One longitudinally extending, marginal edge of each metal sheet 27 is defined by a slightly offset depending flange 28, the purpose of which will be explained hereinafter. The other longitudinally extending, marginal edge of each metal sheet 27 is formed to provide a flat surface 29 disposed normal to the plane of the metal sheet 27. Beads 30, similar to beads 22, are integrally formed with the surfaces 29.

A channel-shaped rib member 31 is suitably secured, as by welding, to one face of each metal sheet 27 at the normally forwardmost end thereof. Each member 31 extends vertically between a respective flat surface 29 and flange 28 and is provided with a projecting flange 32 which extends normal with respect to the plane containing the metal sheet 27, the purpose of which will be explained hereinafter. A rectangular opening is formed in the flat surface 29 which is in alignment with the channel of the rib member 31. A metal retaining strip is secured to the face of each metal sheet 27 opposite the face the rib member 31 is fastened to and adjacent the projecting flange 32 and is formed with an offset portion 33 which is spaced from the metal sheet 27 to provide a vertically extending groove 34. A vertically extending rib member 35 is rigidly connected to the rearwardmost end of each metal sheet 27 to provide a rectangular shaped, vertically extending channel, similar to the channel of rib member 31, which is also in alignment with an opening in the flat surface 29.

Pivotally connected to the normally lower end of each rib member 31, 35, by means of a pair of pivot pins 36, is a channel-shaped stake 37. The stakes 37 are capable of pivoting substantially 90 degrees with respect to the metal sheet 27 between a position wherein they are substantially in vertical alignment with respective rib members 31, 35, and a position wherein they extend substantially perpendicular to the plane of the metal sheets.

Referring to the drawings, it will be noted that the web portion 39 of each rib member 31, 35 is provided with a vertically extending slot 40 through which a bolt 41 extends. The end of the bolt 41 disposed within the channel of a respective rib member 31, 35 is fastened to one end of a lock element, designated generally by numeral 42. The lock element 42 is constructed of a channel member 43 having its legs flanged and fixed to a flat plate 44. A coiled compression spring 45 encircles the bolt portion exteriorly of the channel and yieldably urges the web of the lock element 42 into frictional engagement with the inner surface of the web 39 of a respective rib member 31, 35. From the foregoing, it will be appreciated the lock elements 42 are slidable within the channels of the rib members 31, 35 between unlocked positions wherein the lock elements are completely contained within the rib members and locked positions wherein the lower portions thereof extend into the channels of the stakes 37 and bridge the pivotal connections of the stakes with the rib members. When in the locked positions the lock elements 42 prevent pivotal swinging of the stakes 37 with respect to the metal sheets 27. The coil springs 45 and associated parts function as a releasable detent means for maintaining the lock elements 42 in their locked or unlocked positions.

A closure member 47, a sectional view of which is shown in Figure 18, is pivotally connected at its upper end to the side section 25, 26 by means of a transversely extending horizontal rod 48 which has its ends receivable in open end slots 49 formed in vertical, longitudinally extending, offset flanges 50 which define the normally rearwardmost end of the side section. Clamping levers 51 engage threaded portions on each end of the rod 48 to secure the closure member 47 to the side sections 25, 26. The transversely disposed ends of the closure member 47 are defined by integrally formed, L-shaped flanges 52, one leg 53 of each being adapted to abut a respective flange 50 when in the position shown in Figure 1 and the other leg 54 engaging the rearwardmost edge of the same flange 50.

The transversely extending front panel 55 of the attachment 24 is adapted to be readily assembled on or detached from the vehicle body 12 as is the closure member 47. The front panel 55 includes a generally rectangular flat metal sheet having its top edge defined by a U-shaped bead 56. The vertical side edges of the sheet are bent 90 degrees and provide flanges 57. One leg 58 of a Z-shaped strip 59 is rigidly fastened to the sheet contiguous to the lower margin thereof.

In order to increase the volumetric capacity of the motor truck body 12 by increasing the vertical height of the body above the supporting wall 14, the side sections 25, 26 are placed on the body 12 by first inserting the depending stakes 37 into the stake-receiving pockets or sockets 23 formed in the side panels 13. The side sections 25, 26 are then lowered vertically until the lower ends of the rib members 31, 35 rest upon the top surfaces 21 of the side panels 13. In this position the slightly offset flanges 28 depending from sections 25, 26 abut the inwardly facing surfaces of the side panels 13. Thereafter, each lock element 42 is moved to its locked position as shown in Figure 9 wherein the bolts 41 are disposed in the lower ends of the slots 40, to maintain each attachment side section 25, 26 substantially in vertical alignment with a respective side panel 13. The lower ends of the flanges 57, opposite the U-shaped bead 56, of the front panel 55 are each placed in vertical alignment with a respective groove 34 and the front panel 55 is lowered vertically until the U-shaped bead 60 formed on the top marginal edge of the body panel 20 is received in the space between the lower edge of the front panel and a leg 61 of the strip 59 which is longitudinally spaced from the general plane of the front panel. When in this assembled relationship with the side sections 25, 26 the portion 62 of the Z-shaped strip 59 rests upon the bead 60 and each flange 57 is confined between the respective offset portion 33 of a retaining strip and the adjacent metal sheet 27. The front panel 55 is prevented from moving forwardly in a longitudinal direction relatively to the side section 25, 26 when assembled by means of the projecting flanges 32 which abut the forwardly facing side of the front panel 55. By virtue of the simple unique structure described above, a grain type seal is obtained between the front panel 55 and the panel 20 as well as between the side sections 25, 26 and the side panels 13 of the vehicle body 12.

The rear end of the truck body 12 and attachment 24 is sealed in a grain tight manner by the lower edge of the closure member 47 which is defined by a slightly offset continuation 63. One leg 64 of a metal strip 65 having a Z-shaped cross section is welded to the closure member 47 whereby the opposite leg 66 is longitudinally spaced from the continuation 63. The end gate 16 is swung upwardly and the closure member 47, having previously been mounted on the flanges 15, is swung downwardly until the bead 19 is adjacent the lower edge of the closure member 47. The bead 19 is caused to enter the space between the continuation 63 and the leg 66. The end gate 16 is then locked in its closed position by any suitable means and the clamping levers 51 are tightened to lock the closure member 47 in its locked position.

In the event it is desired to haul livestock or other bulky material requiring side boards that extend a greater vertical distance off the floor 14 than the conventional pick-up type body 12, but where a grain-tight seal between the side boards and the body 12 is not required, the stock rack attachment 78 shown in Figures 2, 5 and 13 can be quickly and easily mounted on the body 12. The stock rack attachment comprises a pair of side sections 79 pivotally connected to a front section 80 at one end and to a rear section 81 at their opposite ends. Each section 79, 80, 81 includes three vertically spaced sheet metal rails 82.

Because of the bulkiness of certain types of cargo such as bales of hay, the horizontal loading area of the floor 14 of a conventional pick-up type truck body is inadequate. The present invention contemplates the provision of additional horizontal loading surfaces by merely removing the closure member 47 and the front panel 55. Thereafter the locked elements 42 are moved to unlocked positions wherein they are completely disposed within respective rib members 31 and 35. Each side section 25, 26 is then free to pivot approximately 90° about a longitudinally extending axis through the pivot pins 36 to the positions shown in Figure 3. When in the positions shown in Figure 3, the side sections 25, 26 lie in substantially a common horizontal plane vertically spaced above the supporting floor 14. To support the side panels 25, 26 in their outwardly extending horizontal positions, two pairs of brace rods 67 are employed. Each brace rod 67 includes an elongated tubular member 68 having one end provided with a bifurcated element 69. The opposite end of the tubular member 68 has an externally threaded portion 70 projecting therefrom. A bifurcated element 71 is threaded on the threaded portion 70. Thus it will be appreciated that the length of each brace rod can be varied. A lock nut 72 is used to clamp the bifurcated element 71 in its adjusted position. Each brace rod 67 is pivotally connected to the truck body 12 by means of a pivot pin 73 which extends through the bifurcations of the element 71 and is supported by a bracket 74 secured adjacent an end of a respective side panel 13. The bifurcated element 69 of each brace rod 67 is optionally connectable to one of three brackets depending upon the disposition of the side sections 25, 26 associated therewith. In the position of the side sections 25, 26 shown in Figure 3 the brace rods 67 are inclined upwardly and outwardly and are connected to brackets 75 secured to the rib members 31, 35 adjacent the flat top surfaces 29. When in the position shown in Figure 1 the bifurcated elements 69 are connected to bracket 76 carried by the rib members 31, 35 adjacent their opposite end. In this position wherein the brace rods 67 are disposed substantially vertically the side sections 25, 26 are prevented from inadvertently moving vertically away from the body 12. The brace rods 67 can also be swung downwardly about the bracket 74 wherein the bifurcated elements 69 are adjacent the lower edges of the side panels 13 and can be secured to brackets 77 fastened to the side panels. In the last described position of the brace rods 67, while not serving as supporting means for the side sections 25, 26 as when the sections are horizontally disposed nor functioning as clamping means for preventing relative vertical movement between the sections and the body 12 as when in vertical positions, are conveniently carried by the truck body 12 and are available for operative engagement with the side sections 25, 26 in either of its two positions of adjustment. The sheet metal rails 82 of the front and rear sections 80, 81 respectively, have their ends confined between the flanges 83 of U-shaped pillar post 84. The ends of sheet metal rails 82 of the side sections 79 are disposed between and are rigidly connected to flanges 85 of pillar posts 86 which are similar to rib members 31, 35 described above. Midway between the pillar post 86 of each side section 19 a channel member 87 is rigidly secured to the rails 82 to add rigidity and strength to the section. Pivotally connected to and depending from each of the pillar posts 86 is a stake 88 which is constructed and functions in the same manner as stake 37 associated with rib members 31 or 35. Stakes 88 are receivable in the stake-receiving sockets 23 formed in the side panels 13. The stakes 88 associated with each side section 79 are pivotal between a position wherein they depend from the side section and lie in substantially the same plane thereof and a position wherein they extend substantially perpendicular from the plane containing the rails 82. It is to be understood that while the means for releasably locking the stakes 88 in the position wherein they lie in the same plane as the rails 82 is not shown in detail, such means are exact duplicates of those described with reference to rib members 31 and 35, and stakes 37. In other words, counterparts of bolt 41, lock element 42, and spring 45 of side sections 25, 26 are employed in the side section 79.

The rear section 81 is removably connected to the side sections 79. The pillar posts 84 of the rear section 81 are each provided with a pair of spaced hinged elements 89 which are alignable with similar hinge elements 90 carried by the rear pillar post 86 of each side section 79. Rods 91 having an offset head portion 92 are adapted to extend through the hinge elements 89 and 90 to connect the rear and side sections 81 and 79 together. The front section 80 is similarly connected to the side section 79 by means of rods 93 and hinge elements 94 and 95 carried respectively by the pillar posts 86 and 84.

Oftentimes because of the kind and size of the cargo to be hauled it is desirable to extend the vertical height of the truck body above that which is obtainable with the utilization of only one of the above described attachments. In order to provide for this contingency, longitudinally spaced openings 96 are formed in the flat upper surfaces 29 of the side sections 25, 26 which are registrable with the channel of rib members 31 and 35. The stakes 88 depending from the pillar post 86 are insertable through the openings 96 into the rib members 31 and 35. Thus the grain tight attachment 24 is assembled on a truck body 12 in the manner described above. Thereafter, the stakes 88 are inserted in the openings 96 and extend into the pocket defined by the rib members 31 and 35 adjacent each end of the side sections 25, 26. The stock rack attachment is then lowered until the bottom surfaces of the pillar posts 86 abut the respective upper surface 29 of the side sections 25, 26 as shown in Fig. 2. The lock bolts associated with the stock rack attachment 78 are moved to the lower end of their respective slots to prevent pivoting of the stakes 88 with respect to the pillar post 86. The stock rack attachment 78 is prevented from moving vertically with respect to the grain-tight attachment 24 in use by means of brace rods 97 which are exact duplicates of brace rods 67 described hereinbefore. The brace rods 97 have one end pivotally connected to a bracket 98 secured to the pillar post 86. The opposite end of each brace rod 97 is quickly connectable to either one of a respective pair of brackets 99, 100. When the side sections 79 of the stock rack attachment 78 are disposed vertically with respect to the side sections 25, 26 of the grain tight attachment 24, each bracket 99 is spaced vertically from a respective bracket 98 a distance substantially equal to the length of the brace rods 97. Consequently, by securing the brace rod ends to the brackets 99 when the stock rack attachment 78 and the grain-tight attachment 24 are in the position shown in Fig. 2, the attachments are firmly secured together.

Figure 4:
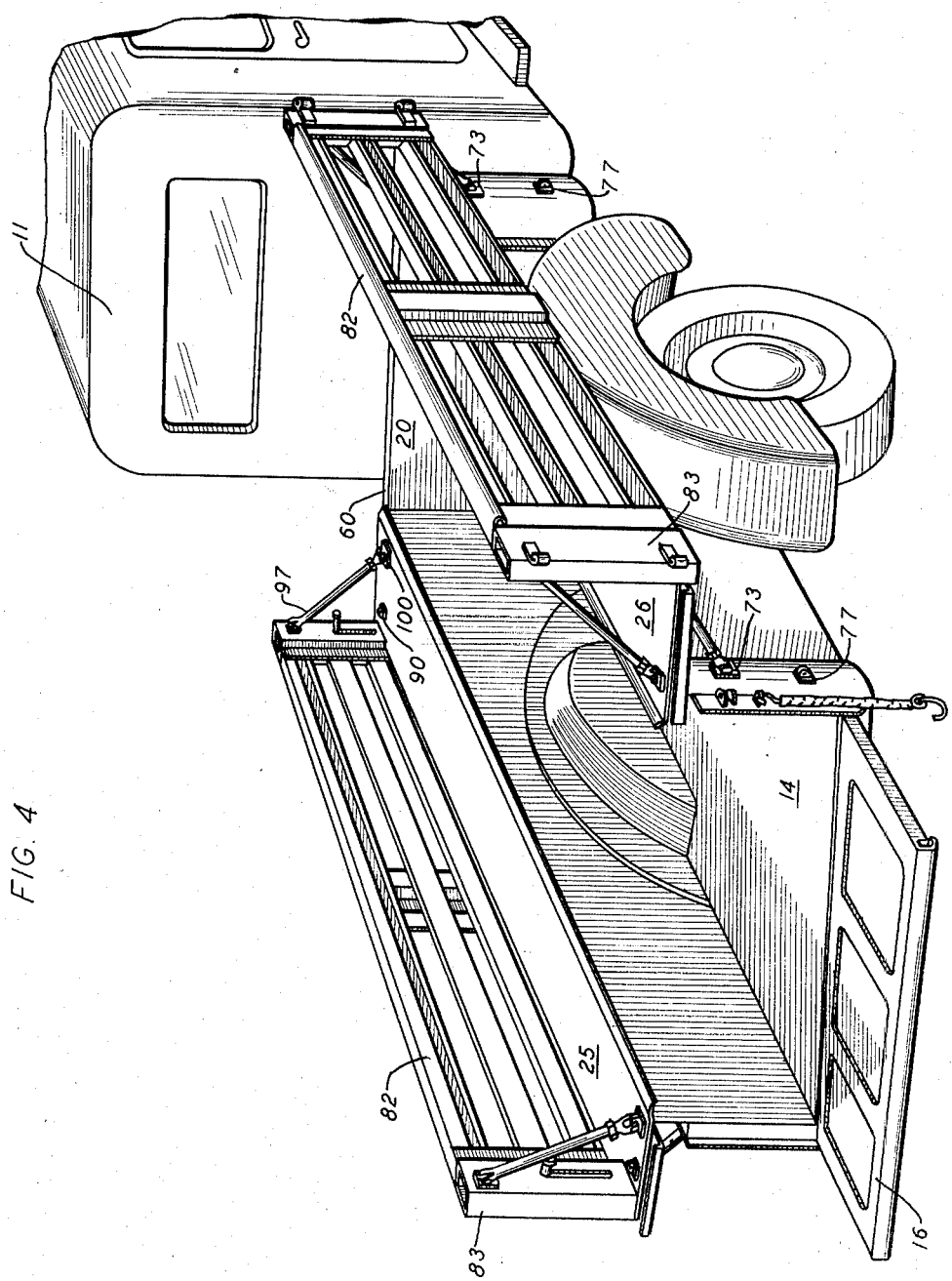
Figure 4 is a view similar to Figure 3 disclosing a stock rack board detachably connected to the outermost edge of each side panel extension.

The side sections 25, 26 of the grain tight attachment 24 and the side section 79 of the stock rack attachment 78 may be optionally oriented as shown in Fig. 4 to provide a seat and back rest, respectively, for carrying personnel. With the body 12 having the grain-tight attachment 24 and stock rack attachment 78 mounted thereon as shown in Fig. 2, the vehicle operator must first remove the front and rear sections 80, 81 by removing the rods 91 and 93. Thereafter, the closure member 47 is disconnected from the side sections 25, 26 by loosening the clamping levers 51. The brace rods 67 are then disconnected from the brackets 76 and the connections of the brace rod 97 with the brackets 99 are also broken. The lock elements 42 associated with the side sections 25, 26 are moved to their unlocked positions, thereby permitting pivoting of each pair of side sections 25, 26 and 79 outwardly to a substantially horizontal position. The free end of the brace rods 67 are then connected to the brackets 76 carried by the side sections 25, 26. The lock elements associated with the side section 79 are then moved to their unlocked positions to permit the side sections 79 to pivot relatively to side sections 25, 26 to the positions shown in Fig. 4. The free ends of the brace rods 97 are then connected to the brackets 100. If desired, front and rear sections 101 and 102, respectively, constructed in the same manner as front and rear sections 80 and 81 but having a longer transverse length may be utilized to bridge the ends of the side sections 79, as shown in Fig. 5.

The embodiments of the invention chosen for the purposes of illustration and description herein are those preferred for achieving the objects of the invention in developing the utility thereof in the most desirable manner, due regard being had to existing factors of economy, simplicity of design and construction and improvements sought to be effected. It will be appreciated, therefore, that the particular structural and functional aspects emphasized herein are not intended to exclude, but rather to suggest, such other adaptations and modifications of the invention as fall within the spirit and scope of the invention as defined in the appended claims.

What is claimed is:

1. A demountable attachment for a pick-up motor truck body or the like having a vertical, upright longitudinally extending side panel provided with a plurality of longitudinally spaced, vertical stake-receiving pockets, comprising: an extension section having a plurality of hollow posts, each of which includes a member fixed to said section and a member pivotally connected to said fixed member depending from one edge of said section and adapted to be telescoped into a respective pocket whereby said section is hingedly mounted on said panel for swinging movement between a vertical upright position wherein each pair of pivotally connected post members are in vertical alignment and a horizontal, flat position; and manually operated lock means associated with each post, each of said lock means including a latch member slidably mounted within a respective post, said latch member being slidable between an unlocked position wherein it is disposed entirely within said fixed post member and a locked position wherein one end thereof extends into said pivotally connected post member when said post members are in their aligned position to prevent pivotal movement of said post members with respect to each other.

2. A demountable attachment for a pick-up type motor truck body or the like substantially as set forth in claim 1, in which, yieldable means are provided for urging said latch members into frictional engagement with said fixed members to resist relative sliding movement therebetween.

3. A demountable attachment for a pick-up type motor truck body or the like having a pair of transversely spaced, upright side panels interconnected at one end by a front panel and its opposite end by an endgate, each of said side panels being provided with a pair of longitudinally spaced, vertically disposed stake-receiving sockets, comprising: a pair of side extension sections, each section having a pair of stakes depending therefrom receivable in said sockets, one end of each section being provided with a vertical flange extending transversely inwardly from the general plane of a respective section, the opposite end of each section being provided with a vertical longitudinally extending flange lying in a plane spaced from and parallel to the general plane of a respective section, each of said sections having a vertical retaining strip secured to the end thereof adjacent the inwardly extending flange having an offset portion inwardly spaced from and substantially parallel to the general plane of said side section to provide a groove; a transverse front section having its transverse ends provided with rearwardly extending flanges lying in planes disposed normal to the general plane of said front section, said rearwardly extending flanges being vertically slidably receivable in said grooves, said inwardly extending flanges abutting portions of the front section when said front section is mounted on said truck body; and a closure member having its upper end pivotally connected to and supported by said longitudinally extending flanges of said side section, said closure member being swingable about a transverse horizontal axis, the lower marginal edge of said member being provided with a pair of spaced depending projections for embracing the upper marginal edge of said endgate.

4. A demountable attachment for a pick-up type motor truck body or the like substantially as set forth in claim 3, in which, the lower marginal edge of said front section is provided with a pair of transversely extending, spaced depending projections for embracing the upper marginal edge of said front panel.

5. A demountable attachment for a pick-up type motor truck body or the like having a pair of transversely spaced upright side panels, each of said panels being provided with a pair of longitudinally spaced, vertically disposed stake-receiving sockets, comprising: a pair of side extension sections, each section having a pair of hollow posts, each of which includes a member fixed to said section and a member pivotally connected to said fixed member depending from one edge of said section and adapted to be telescoped into a respective socket whereby each of said sections is hingedly mounted on a respective side panel for swinging movement between a vertical upright position and a horizontal, transversely outwardly extending position; a second pair of side extension sections, each of said second side extension sections having a pair of members pivotally connected thereto and depending from one edge thereof adapted to be telescoped into a respective post of a respective first side section whereby each of said second side sections is hingedly mounted on a respective first side section for swinging movement between a vertically aligned position wherein respective first and second side sections lie in substantially the same vertical plane, and an offset position wherein each of said second side sections lie in a plane substantially perpendicular to the plane containing a respective first side section; and manually operative means associated with said first and second side sections operable to prevent swinging movement of said second side sections from their aligned positions with respect to said first side sections and to prevent swinging movement of said first side sections from their vertical positions, each of said first side sections having a pair of brackets spaced vertically when said sections are in their vertical positions; said brackets being secured to said first side sections, each of said side panels having a brace rod having one end thereof pivotally connected thereto, and quick detachable means for selectively connecting the opposite end of each of said brace rods to either of the brackets of a respective first side section to support said first side sections in their horizontal positions and prevent vertical displacement of said first side sections with respect to said side panels in their vertical positions.

6. A demountable attachment for a pick-up type motor truck body or the like having a vertical longitudinally extending side panel, comprising: an extension side section; quick detachable hinge means for pivotally connecting one longitudinal marginal edge of said side section to the upper marginal edge of said side panel whereby said section is swingable between a vertical position and a horizontal position; first adjustable brace rod means extending between and connected to said panel and said section when said side section is in its vertical and horizontal positions, said first brace rod means including a bracket secured to the outwardly basic side of said side panel, an elongated brace rod having one end pivotally connected to said bracket, a pair of brackets secured to said first side section, said last mentioned brackets being vertically spaced when said first side section is in its vertical position, the free end of said brace rod being engageable to the lowermost of said last mentioned brackets when said first side section is in its vertical position and with the other of said last mentioned brackets secured to said first side section when said first side section is in its horizontal position, and pin means for releasably connecting the free end of said brace rod to said last mentioned brackets; a second side extension section; quick detachable hinge means for pivotally connecting one longitudinal marginal edge of said second section to the longitudinal marginal edge of said first section opposite said first mentioned longitudinal marginal edge whereby said second section is swingable between a vertical position wherein said section is in vertical alignment with said first section when said first section is in its vertical position and an offset vertical position wherein said second section is substantially parallel to and transversely spaced from said side panel when said first section is in its horizontal position; and second adjustable brace rod means extending between and connected to said first and second sections when said second section is in its vertically aligned and vertically offset positions with respect to said first section.

7. A demountable attachment for a pick-up type motor truck body or the like substantially as set forth in claim 6, in which said second brace rod means includes a bracket secured to the inwardly facing side of said second side section, an elongated brace rod having one end pivotally connected to said bracket, a pair of brackets secured to said first side section, said last mentioned brackets being vertically spaced when said first side section is in its vertical position, the free end of said brace rod being engageable with the uppermost of said last mentioned brackets when said first side section is in its vertical position and with the other of said last mentioned brackets when said first side section is in its horizontal position, and pin means for releasably connecting the free end of said brace rod to said last mentioned brackets.

References Cited in the file of this patent

UNITED STATES PATENTS

| | | |
|---|---|---|
| 333,944 | Grimes | Jan. 5, 1886 |
| 946,981 | Newberry | Jan. 18, 1910 |
| 983,188 | Walters | Jan. 31, 1911 |
| 1,407,237 | Thompson et al. | Feb. 21, 1922 |
| 1,510,798 | Poe | Oct. 7, 1924 |
| 2,133,902 | Patrick | Oct. 18, 1938 |
| 2,573,395 | Breitbarth | Oct. 30, 1951 |

FOREIGN PATENTS

| | | |
|---|---|---|
| 36,214 | Denmark | June 25, 1926 |

(Corresponding British Patent No. 207,524, July 10, 1924)